(12) United States Patent
Chen et al.

(10) Patent No.: US 10,121,245 B2
(45) Date of Patent: Nov. 6, 2018

(54) IDENTIFICATION OF INFLAMMATION IN TISSUE IMAGES

(71) Applicants: UNIVERSITY OF NOTRE DAME, South Bend, IN (US); UNIVERSITY OF CALIFORNIA, Oakland, CA (US)

(72) Inventors: Danny Ziyi Chen, Granger, IN (US); Jiazhuo Wang, Sunnyvale, CA (US); John DeWolfe MacKenzie, San Francisco, CA (US); Rageshree Ramachandran, San Francisco, CA (US)

(73) Assignee: UNIVERSITY OF NOTRE DAME, South Bend, IN (US)

( * ) Notice: Subject to any disclaimer, the term of this patent is extended or adjusted under 35 U.S.C. 154(b) by 55 days.

(21) Appl. No.: 15/264,836

(22) Filed: Sep. 14, 2016

(65) Prior Publication Data

US 2017/0076448 A1  Mar. 16, 2017

Related U.S. Application Data

(60) Provisional application No. 62/218,351, filed on Sep. 14, 2015.

(51) Int. Cl.
*G06K 9/00* (2006.01)
*G06T 7/00* (2017.01)
*G06K 9/48* (2006.01)
*G06T 7/12* (2017.01)
*G06T 7/162* (2017.01)

(52) U.S. Cl.
CPC .......... *G06T 7/0012* (2013.01); *G06K 9/0014* (2013.01); *G06K 9/00147* (2013.01); *G06K 9/48* (2013.01); *G06T 7/12* (2017.01); *G06T 7/162* (2017.01); *G06T 2207/10024* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

2002/0186875 A1* 12/2002 Burmer .............. G06K 9/00127
382/133

* cited by examiner

*Primary Examiner* — Atiba O Fitzpatrick
(74) *Attorney, Agent, or Firm* — Tarolli, Sundheim, Covell & Tummino LLP

(57) ABSTRACT

Systems and methods are provided for identifying markers for inflammation in a tissue image. The tissue image is captured as an image of a histology slide. Subcellular structures in the tissue image are segmented via a first automated process to identify at least one variety of immune cells within the image. Glands and vilii are identified within the tissue image via a second automated process. Neutrophils are identified within the tissue image via a third automated process. An output representing the identified glands, villi, neutrophils, and other immune cells is provided to a human operator.

5 Claims, 4 Drawing Sheets

IDENTIFICATION OF INFLAMMATION IN TISSUE IMAGES

RELATED APPLICATIONS

This application claims priority from U.S. Patent Application Ser. No. 62/218,351, filed 14 Sep. 2015, which is incorporated herein in its entirety.

GOVERNMENT SUPPORT

This invention was made with government support under Grant No. CCF-1217906 awarded by the National Science Foundation (NSF), and Grant No. K08-AR061412-02 awarded by the National Institute of Health (NIH). The government has certain rights in the invention.

TECHNICAL FIELD

This invention relates to medical images, and more particularly, to identifying inflammation in tissue images.

BACKGROUND

Human or mammalian tissue samples (e.g., samples taken during a biopsy procedure) may be processed using hematoxylin and eosin (H&E) staining techniques in order to generate H&E stained histology tissue images. H&E stained histology tissue images may be analyzed to diagnose diseases, including inflammatory diseases. Conventionally, in order to diagnose inflammatory diseases, H&E stained histology tissue images are manually analyzed by a trained pathologist, which can be tedious and time consuming. Pathologists often rely on features of the subcellular structures, such as the nucleus and cytoplasm, to differentiate different types of immune cells. Accurate segmentation of the subcellular structures can help classify cell types. However, segmentation in histology tissue images is very challenging, due to intra-class variations and inter-class similarity, complex and crowded background, and noisy data.

SUMMARY OF THE INVENTION

In accordance with an aspect of the present invention, a method is provided for identifying markers for inflammation in a tissue image. The tissue image is captured as an image of a histology slide. Subcellular structures in the tissue image are segmented via a first automated process to identify at least one variety of immune cells within the image. Glands and villi are identified within the tissue image via a second automated process. Neutrophils are identified within the tissue image via a third automated process. An output representing the identified glands, villi, neutrophils, and other immune cells is provided to a human operator.

In accordance with another aspect of the present invention, a method is provided for segmenting subcellular structures in a tissue image. A constrained energy minimization framework is formulated for the subcellular segmentation problem. A layered graph model is generated to solve the constrained energy minimization framework optimally in polynomial time. This layered graph model, comprising a plurality of vertices and a plurality of edges, is constructed according to at least one constraint of the constrained energy minimization framework. Respective weights are determined for each of the plurality of vertices and the plurality of edges according to at least one photometric prior. A set of boundaries for the nucleus and the cytoplasm represented by a path having the lowest total energy in the layered graph model is determined.

In accordance with yet another aspect of the present invention, a method is provided for identifying glands and villi within a tissue image. A superpixel segmentation of the image, comprising a plurality of superpixels, is generated. Each of the plurality of superpixels is classified as one of epithelium, lumen, and extracellular material. An initial pseudo-probability map is generated from the classified plurality of superpixels. A plurality of candidate objects in the tissue image is generated according to the generated initial pseudo-probability map. The pseudo-probability map is updated according to the newly generated candidate objects so that future candidates generated from the updated pseudo-probability map are more accurate. Each candidate object is classified by an associated pattern recognition classifier.

In accordance with still another aspect of the present invention, a method is provided for identifying neutrophils in tissue images. A segmentation of the tissue image is generated such that the nucleus lobes of each cell of a plurality of cells are grouped into one segment, which contains no lobes from other cells, to provide a plurality of segments. Each of the plurality of segments is classified to identify a plurality of high confidence examples of neutrophils and non-neutrophil cells. Applying a clustering process, utilizing a Voronoi diagram of clusters model, to the classified segments, it locates high-confidence and low-confidence examples of neutrophils and non-neutrophil cells. A plurality of classifiers is generated, each representing a Voronoi diagram cell. Each ambiguous segment of the plurality of segments is classified with at least one of the plurality of classifiers as a neutrophil or a non-neutrophil.

DETAILED DESCRIPTION

In general, this disclosure describes techniques for analyzing tissue images, such as hematoxylin and eosin (H&E) stained tissue images, to diagnose inflammatory diseases. There are four types of immune cells commonly analyzed in the diagnosis of inflammatory diseases: neutrophils, plasma cells, lymphocytes, and eosinophils, and the techniques described herein may be used to identify and classify these types of immune cells and provide analytic information that may assist diagnostic pathologists. Pathologists often rely on features of the subcellular structures to differentiate different types of immune cells, and accurate segmentation of the subcellular structures can help classify cell types. Further, architectural distortions of glands and villi are indicators of chronic inflammation, but the "duality" nature of these two structures causes ambiguity for their detection in H&E histology tissue images, especially when multiple instances are clustered closely together. In one example, the techniques described herein may be used to accurately segment and detect immune cells, glands, and villi to assist in the diagnosis of inflammation.

Figure 1:
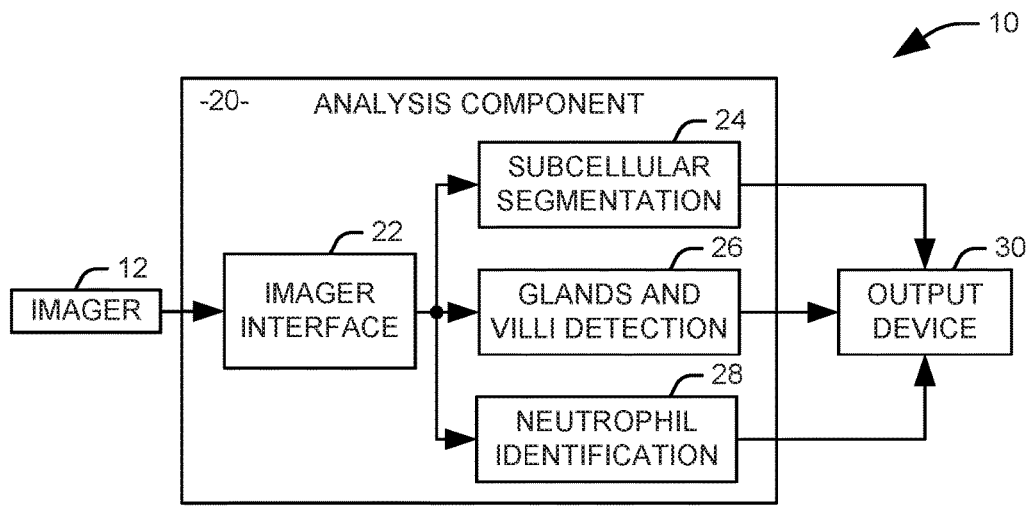
FIG. 1 illustrates one example of system for identifying inflammation in tissue images.

FIG. 1 illustrates one example of system 10 for identifying inflammation in tissue images. To this end, the system 10 includes an imager 12 configured to capture a digital image from a slide containing tissue. For example, the imager 12 can be a digital camera and/or a microscope configured to capture histology tissue images. In one example, the tissue can be taken from the gastrointestinal tract of a human being, although it will be appreciated that the systems and methods described herein are not limited to this application. To enhance the visibility of the tissue, chemical stains are applied; the routine stains in diagnostic pathology tissue processing are hematoxylin and eosin, which highlight cellular substructure.

The captured image is provided to an analysis component 20 via an imager interface 22. It will be appreciated that the analysis component 20 can be implemented as dedicated hardware, for example, on an application specific integrated circuit, software or firmware stored on a non-transitory computer readable medium and executed by an associated processor, or a mix of both. In one implementation, the imager interface 22 can represent appropriate hardware and/or software for receiving a previously captured image, for example, via a universal serial bus port, a network interface, or other data connection. Alternatively, the imager interface 22 can include appropriate hardware and/or software to instruct the imager 12 to capture the image, preprocess the image for analysis, and format for further analysis of the image content.

The analysis component 20 further includes a subcellular segmentation component 24 configured to segment structures within a given cell to facilitate identification of the cell, such as the nucleus and cytoplasm. In one example, the subcellular segmentation component 24 is configured to segment the nucleus and cytoplasm of each given cell in the original image by finding two x-monotone boundaries, where an x-monotone boundary is one that intersects each vertical line at a single point in an unwrapped image that minimizes an energy framework with certain constraints. The determined boundaries can be used to classify the cell as one of several different types of immune cells, such as plasma cells, lymphocytes, and eosinophils.

A glands and villi detection component 26 is configured to detect glands and villi within the tissue image. In one implementation, the glands and villi detection component 26 is configured to extract one or more pseudo-probability maps (PPMs) for possible candidates of target objects in the image, generate one or more object proposals based at least in part on the one or more PPMs, and verify the one or more object proposals. A neutrophil identification component 28 is configured to identify neutrophils within the tissue image. Specifically, the neutrophil identification component 28 can segment the image, classify the segments to identify high-confidence and low-confidence examples, and apply a clustering algorithm, including construction of a Voronoi diagram of clusters, to identify high-confidence neutrophils forming clusters and ambiguous neutrophils. It will be appreciated that each of the subcellular segmentation component 24, glands and villi detection component 26, and the neutrophil identification component 28 can share components and functions in common. The output of each of the subcellular segmentation component 24, glands and villi detection component 26, and the neutrophil identification component 28 can be provided to an operator at an associated output device 30, such as a display.

In view of the foregoing structural and functional features described above in FIG. 1, example methods will be better appreciated with reference to FIGS. 2-5. While, for purposes of simplicity of explanation, the methods of FIGS. 2-5 are shown and described as executing serially, it is to be understood and appreciated that the present invention is not limited by the illustrated order, as some actions could in other examples occur in different orders and/or concurrently from that shown and described herein.

Figure 2:
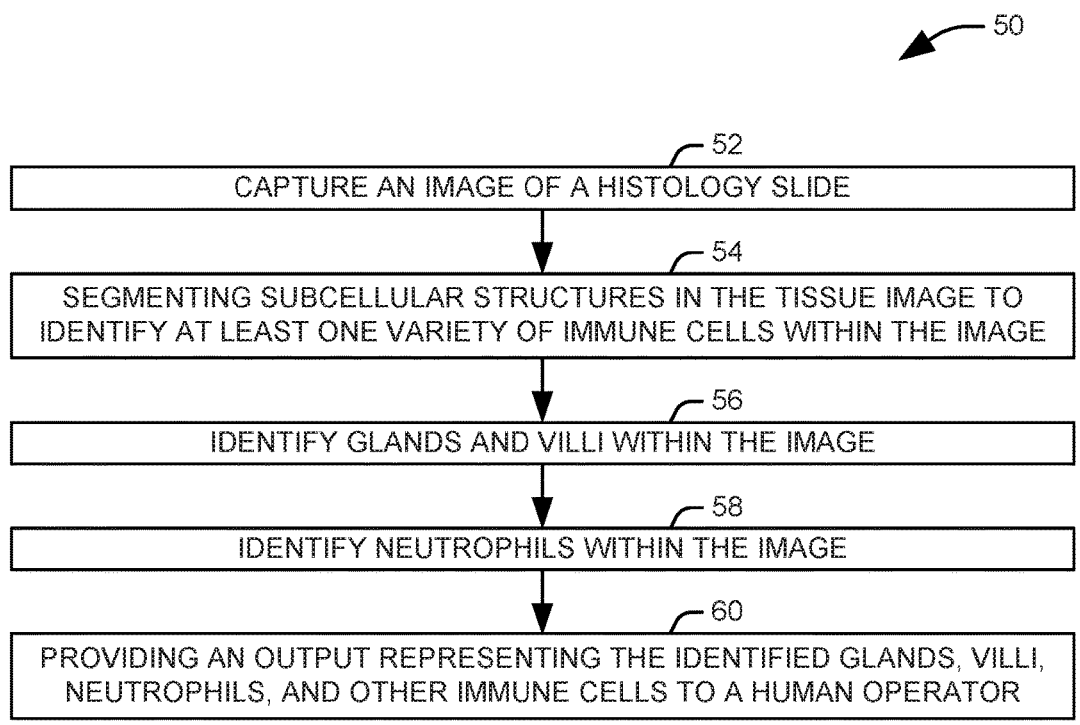
FIG. 2 illustrates a method for identifying markers for inflammation in a tissue image.

FIG. 2 illustrates a method 50 for identifying evidence of inflammation in a tissue image. At 52, the tissue image is captured as an image of a histology slide. At 54, subcellular structures in the tissue image are segmented via a first automated process to identify at least one variety of immune cells within the image. The determined boundaries can be used, for example, to classify a target cell as one of several different types of immune cells, such as plasma cells, lymphocytes, and eosinophils. In one example, a layered graph model, comprising a plurality of vertices and a plurality of edges, is constructed according to at least one constraint. Respective weights are determined for each of the plurality of vertices and the plurality of edges according to at least one photometric prior. A set of boundaries for nucleus and cytoplasm having the lowest total energy in the layered graph model is determined At 56, glands and villi are identified within a tissue image via a second automated process. In one example, a super-pixel segmentation of the image, comprising a plurality of superpixels, is generated. Each of the plurality of superpixels is classified as one of epithelium, lumen, and extracellular material. An initial pseudo-probability map is generated from the classified plurality of superpixels. A plurality of candidate objects in the tissue image is generated according to the generated initial pseudo-probability map to provide a plurality of candidate objects. The pseudo-probability map is updated according to the newly generated candidate objects so that future candidates generated from the updated pseudo-probability map are more accurate. Each candidate object is classified by an associated pattern recognition classifier.

At 58, neutrophils are identified within the tissue image via a third automated process. In one example, a segmentation of the tissue image is generated such that the nucleus lobes of each cell of a plurality of cells are grouped into one segment, which contains no lobes from other cells, to provide a plurality of segments. Each of the plurality of segments is classified to identify a plurality of high confidence examples of neutrophils and non-neutrophil cells. Applying a clustering process, utilizing a Voronoi diagram of clusters model, to the classified segments, it locates high-confidence and low-confidence (i.e., ambiguous) examples of neutrophils and non-neutrophil cells. A plurality of classifiers is generated, each representing a Voronoi diagram cell. Each ambiguous segment of the plurality of segments is classified with at least one of the plurality of classifiers as a neutrophil or a non-neutrophil. At 60, an output representing the segmented subcellular structures and the identified glands, villi, and neutrophils is provided to a human operator.

Figure 3:
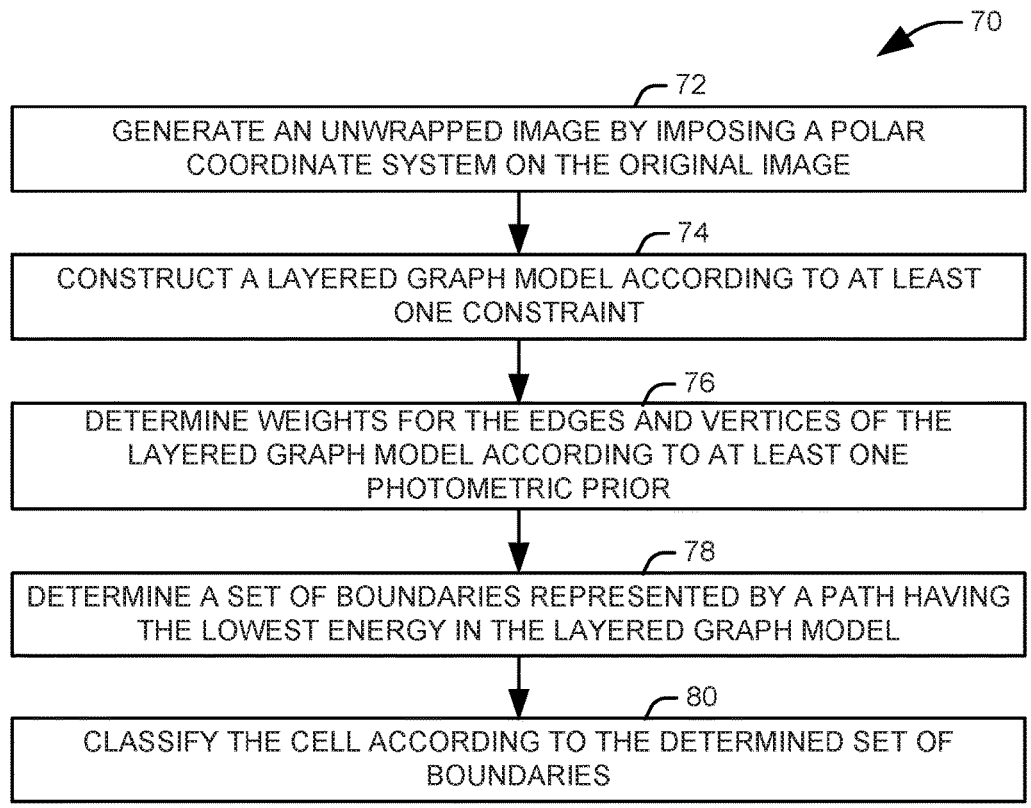
FIG. 3 illustrates a method for segmenting subcellular structures in an image of a cell and classifying the segmented cell.

FIG. 3 illustrates a method 70 for segmenting subcellular structures in an image of a cell and classifying the segmented cell. Pathologists often rely on features of the subcellular structures and spaces, such as the nucleus and cytoplasm, to differentiate different types of immune cells in histology tissue images. For example, a plasma cell has a relatively large cytoplasmic area, and the nucleus is located in an eccentric position within the cytoplasm, while a lymphocyte has a relatively small cytoplasmic area. Therefore, accurately segmenting the subcellular structures helps classify the cell types—better segmentation leads to better classification.

It is very challenging to obtain accurate segmentation in histology tissue images, due to intraclass variations and interclass similarity with respect to staining, shape and size, a complex and crowded background with a mixture of different biological structures, and noisy data. The inventors have found that utilizing as many as possible different geometric and photometric priors can alleviate these challenges, but existing segmentation algorithms cannot be readily modified to exploit these priors. To this end, the inventors have created an energy minimization framework with constraints to accurately segment the subcellular structures of each given cell. The energy terms reflect different photometric priors, and the constraints reflect different geometric priors. The inventors have also created a layered graph model to solve the energy minimization problem optimally in polynomial time. Accordingly, a significant improvement in the accuracy of this segmentation, and thus the underlying cell identification, has been realized.

For a given cell, it is more straightforward to incorporate the priors of the subcellular structures on an unwrapped image than on the original image. Accordingly, at 72, an unwrapped image is generated by imposing a polar coordinate system on the original image. In one example, the pole of the polar coordinate system is placed at the center of the cell, and the polar axis points to the right. The row index and column index $(r(p), \phi(p))$ of each pixel, p, in the unwrapped image reflect respectively the radius and polar angle of p in the original image. The unwrapped image therefore contains a number of rows, R, with each row representing pixels at a common radial distance from the pole, and a number of columns, C, representing pixels having a common axial direction. In one implementation, the unwrapped image contains thirty columns and thirty rows.

The method segments the nucleus and cytoplasm of each given cell in the original image as finding two x-monotone boundaries, denoted herein as $B_1$, for the outer boundary of the nucleus, and $B_2$, for the outer boundary of the cytoplasm. As used herein, an x-monotone boundary is a boundary that intersects each vertical line in the unwrapped image at a single point, while providing a minimum energy, as is discussed below. The minimization process incorporates photometric priors into different energy terms, and geometric priors into different constraints.

In one implementation, three photometric priors are used and included as energy terms in the energy minimization. A first energy term, $D_i(p)$, penalizes a pixel p, if it is not likely to be on a given boundary, $B_i$. Essentially, $D_i(p)$ evaluates the probability that a pixel belongs to a given boundary according to the photometric properties of the pixel, such as its hue, saturation, and value, or brightness, referred to as the HSV values of the pixel. In one implementation, a random forest classification system is used to generate the probability that the pixel is on a given boundary based on its raw HSV values and $D_i(p)$ is determined as the additive inverse of this probability. It will be appreciated, however, that other classification and regression algorithms could be used for this purpose. As it depends solely on the single pixel, $D_i(p)$ is a unary term.

A second photometric prior, O(p, q), represents the properties of pixels inside the nucleus region and the cytoplasm region, specifically how the properties of the pixels match their assigned region for a given set of boundaries. O(p, q) is a pairwise term between vertically related pixels in the unwrapped image, or pixels sharing a same axial direction from the pole in the original image. Given a pair of pixels (p, q) representing the position of the nucleus and cytoplasm boundaries on a given column of the unwrapped image, O(p, q) penalizes pixels on the column below p (denoted as LOW(p, q)), if these pixels are not likely to be inside the nucleus region, and it penalizes pixels on the column between p and q (denoted as MID(p, q)), if these pixels are not likely to be inside the cytoplasm region. In one implementation, O(p, q) can be calculated as:

$$O(p,q) = \text{avg}(\Sigma_{a \in LOW(p,q)}[1-P_{nucR}(a)]) + \text{avg}(\Sigma_{a \in MID(p,q)}[1-P_{cytoR}(a)])$$  Eq. 1 where avg( ) denotes an arithmetic mean of the argument, $P_{nucR}(a)$ is the probability that a given pixel, a, in the column of the unwrapped image to which p and q belong, is part of the nucleus and $P_{cytoR}(a)$ is the probability that a is part of the cytoplasm. In one implementation, a random forest classification system is used to generate these probabilities from the raw HSV values of the pixels, but it will be appreciated that other classification and regression algorithms could be used for this purpose.

A third photometric prior, $V_i(p_a, p_b)$, is a pairwise term between horizontally related pixels in the unwrapped image. $V_i(p_a, p_b)$ penalizes pixels $p_a$ and $p_b$, if they are not likely to belong to the same boundary $B_i$, to favor local photometric smoothness of the boundary, that is, the properties of pixels on two adjacent columns belonging to the same boundary should be similar. In one implementation, this term is calculated separately for each boundary, and each of $V_1(p_a, p_b)$ and $V_2(p_a, p_b)$ can be calculated as:

$$V_1(p_a, p_b) = 0.5(2 - P_{nucB}(p_a) - P_{nucB}(p_b))\text{avg}(\text{diff}[\text{HSV}(p_a), \text{HSV}(p_b)])$$

$$V_2(p_a, p_b) = 0.5(2 - P_{cytoB}(p_a) - P_{cytoB}(p_b)) * \text{avg}(\text{diff}[\text{HSV}(p_a), \text{HSV}(p_b)])$$  Eq. 2 where $P_{nucB}(p_a)$ is the probability that a given pixel in a first column of the unwrapped image belongs to the boundary of the nucleus, $P_{nucB}(p_b)$ is the probability that a given pixel in a second column, adjacent to the first column, of the unwrapped image belongs to the boundary of the nucleus, $P_{cytoB}(p_a)$ is the probability that a given pixel in the first column belongs to the boundary of the cytoplasm, $P_{cytoB}(p_b)$ is the probability that a given pixel in the second column belongs to the boundary of the cytoplasm, and diff[HSV $(p_a)$, HSV $(p_b)$] is the sum of the absolute difference of the raw HSV values between $p_a$ and $p_b$.

In one implementation, two constraints are applied to the energy minimization, a first constraint based on geometric smoothness and a second constraint based on separation priors. The geometric smoothness constraint represents a smoothness of each individual boundary. Effectively, the geometric smoothness constraint requires that the row index in the unwrapped image should not change abruptly. A maximum difference in the row indices can be set as a constant, $S_i$, which is a constant measuring the toleration for such change on each boundary $B_i$. In one implementation, $S_1$, representing a maximum change in row index between columns for the nucleus boundary, is set as one, and $S_2$, representing a maximum change in row index between columns for the cytoplasm boundary, is set as three.

The geometric separation constraint captures the relation that the cytoplasm boundary should contain the nucleus boundary and there should be some gap between them. In one implementation, this constraint is implemented as a range, with a lower bound and an upper bound, for the difference between the row index of the cytoplasm boundary and the row index of the nucleus boundary within each column. In one implementation, the lower bound is zero and the upper bound is twenty-five, such that a difference between the row index of the cytoplasm and the row index of the nucleus must be positive and less than twenty-five within each column. Accordingly, the energy minimization problem for one implementation can be conceptualized as:

$$E(B_1, B_2) = \sum_{i=1}^{2}\sum_{p \in B_i} D_i(p) + \sum_{(p,q) \in N} O(p, q) + \sum_{i=1}^{2}\sum_{(p_a, p_b) \in N_i} V_i(p_a, p_b); \quad \text{Eq. 3}$$

$$\text{s.t.:} \ |r(p_b) - r(p_a)| \leq S_i, (p_a, p_b) \in N_i,$$

$$i = 1, 2; LB \leq r(q) - r(p) \leq UB, (p, q) \in N$$

where $r(a)$ is the row index of a pixel $a$, LB is the lower bound, UB is the upper bound, $(p, q) \in N$ denotes that $p$ and $q$ are boundary pixels on the same column, and $(p_a, p_b) \in N_i$, denotes that $p_a$ and $p_b$ are pixels on the same boundary in adjacent columns.

At 74, a layered graph model, comprising a plurality of vertices and a plurality of edges, is constructed according to at least one constraint. The layered graph model is used to find the two boundaries for nucleus and cytoplasm having the minimum total energy, for example, minimizing the energy from Eq. 3. In one example, the construction of vertices is guided by the geometric separation constraint, such that for any pair of pixels in the same row that are separated by a distance within the range defined by the geometric separation constraint (e.g., LB≤r(q)−r(p)≤UB), a vertex, $v=(r(p), r(q))$, is constructed. All vertices defined according to a single column in the unwrapped image can be viewed as forming a two-dimensional layer, such that there are C layers corresponding to the C columns in the unwrapped image. A final layer, Layer C+1, is added on top of Layer C, as a copy of Layer 1, to reflect that the first and last columns in the unwrapped image are cyclically adjacent.

The construction of edges within the layered graph is guided by the geometric smoothness constraint. Each edge connects two vertices on two consecutive layers that are sufficiently close in row index to represent the potential boundaries, given the smoothness constraint. Specifically, for each vertex $v=(r(p), r(q))$ on a given layer i, a directed edge goes from v to every vertex $v'=(r(p'), r(q'))$ on a next layer i+1 for which $|r(p)-r(p')|\leq S_1$ and $|r(q)-r(q')|\leq S_2$. A path in the layered graph represents a cycle-path if it starts at a vertex $v=(r(p), r(q))$ on Layer 1 and ends at the corresponding vertex $v'=(r(p'), r(q'))$ on Layer C+1, with $r(p)=r(p')$ and $r(q)=r(q')$. Such a cycle-path corresponds to a pair of feasible boundaries satisfying the two geometric constraints in the unwrapped image.

At 76, respective weights are determined for each of the plurality of vertices and the plurality of edges according to at least one photometric prior. In one example, energy terms based on the photometric priors are incorporated into the vertex/edge weights, so that the shortest cycle-path in the layered graph corresponds to the pair of boundaries minimizing the energy in Eq. 3. To this end, the weight of each vertex $v=(r(p), r(q))$ is assigned as the sum of $D_1(p)$, $D_2(q)$, and $O(p, q)$. Note that the weights of vertices in Layers 1 and C+1 are set to be half of the computed value, because these two layers correspond to the same column in the unwrapped image. The weight of each edge is determined as $e=(v, v')$, where $v=(r(p), r(q))$ and $v'=(r(p'), r(q'))$, as the sum of $V_1(p, p')$ and $V_2(q, q')$. Using these weight assignments, the length of each cycle-path corresponds to the energy of a pair of boundaries defined in Eq. 3, and the shortest cycle-path captures the pair of boundaries minimizing the energy.

At 78, a set of boundaries represented by a path having the lowest total energy in the layered graph model is determined. In one example, the layered graph is configured to be a directed acyclic graph, such that any shortest path algorithm suitable for use on a directed acyclic graph can be applied for this purpose. In one implementation, having C columns and R rows, the directed acyclic graph will have $O(CR^2)$ vertices and $O(S_1 S_2 CR^2)$ edges, and the shortest cycle-path can be found in $O(S_1 S_2 CR^4)$ time by using such an algorithm, allowing for efficient segmentation of the nucleus and cytoplasm of each cell. At 80, the cell is classified according to the determined set of boundaries. In one example, cells are classified into plasma cells and lymphocytes based on features extracted from the segmented subcellular structures. For example, the classification can use at least a cytoplasm area determined from the segmentation boundaries, the ratio between a nucleus area and the cytoplasm area determined from the segmentation boundaries, and a distance between a center of the nucleus and the center of the cytoplasm, which provides an eccentricity measurement.

Figure 4:
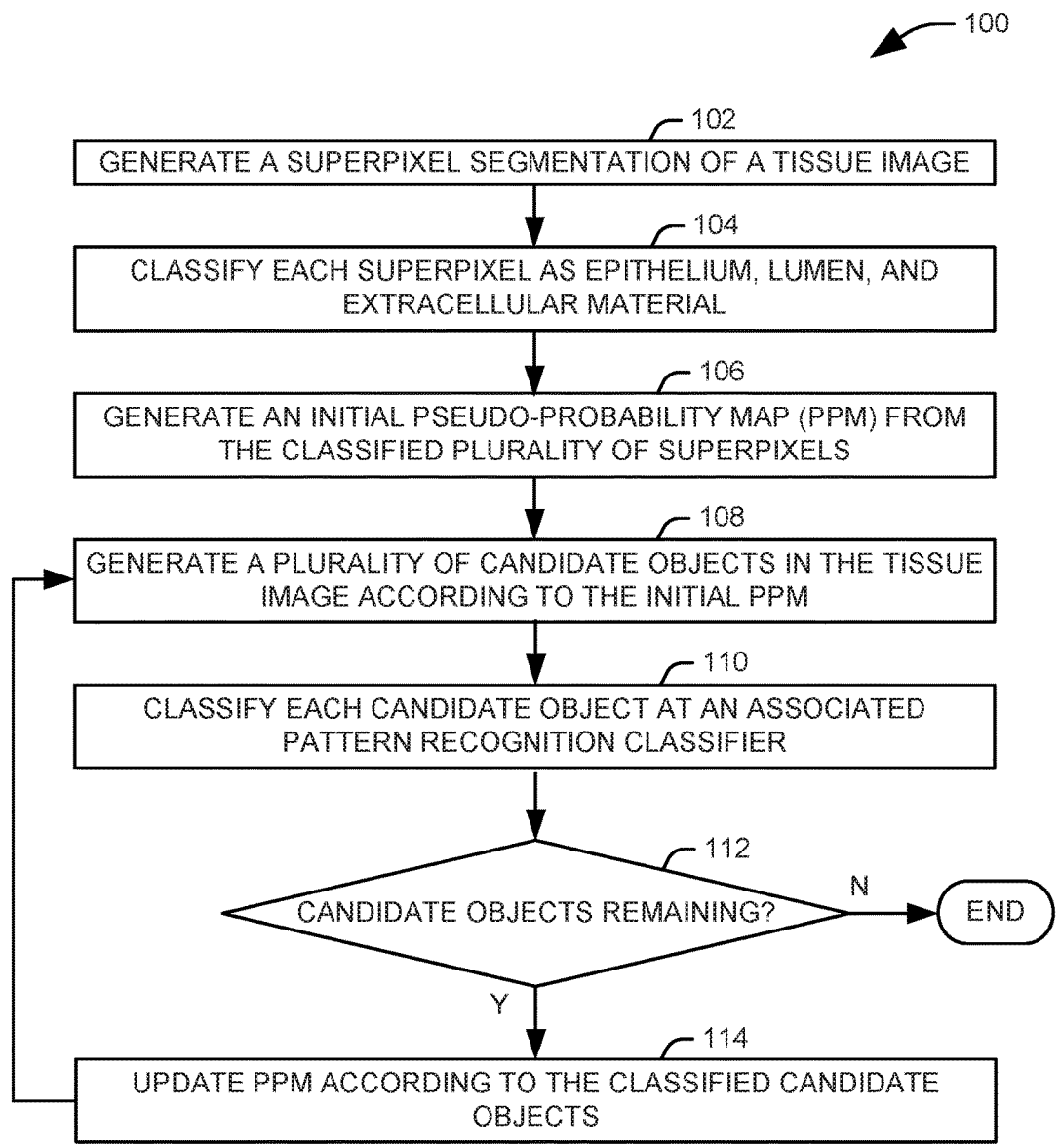
FIG. 4 illustrates a method for locating glands and villi within a tissue image.

FIG. 4 illustrates a method 100 for locating glands and villi within a tissue image. Architectural distortions of glands and villi are strong signs of chronic inflammation, and a quantitative measurement of the degree of such distortions may help determine the severity of the chronic inflammation. The inventors have determined a method to detect these two biological structures with enhanced accuracy. Both glands and villi are actually composed of epithelium, but a gland encloses lumen and is surrounded by extracellular material, while a villus encloses extracellular material but is surrounded by lumen. In histology tissue images, the detection challenges of glands and villi are mainly due to the "duality" of the two structures, especially when multiple instances are clustered closely together. Detection is further complicated by the complex tissue background, which generally contains different biological structures, such as different types of cells and connective tissue, and the variable appearances of glands and villi due to morphology, staining, and scale.

The inventors have combined domain knowledge and deep learning processes to simultaneously detect glands and villi in histology tissue images, such as H&E-stained histology tissue images. The inventors have observed that once an object of some class, that is, glands or villi, has been detected with a predetermined degree of confidence, this information can be propagated to the neighborhood of the detected object, so that the detection ambiguity nearby is reduced. Accordingly, the method extracts pseudo-probability maps (PPMs) for possible candidates of the target objects, using domain knowledge on the appearances of glands and villi, generates object proposals, referred to as candidate objects, from the PPMs and provides the candidate objects to classifiers, such as convolutional neural networks (CNN) to verify whether each object is of the class claimed by PPMs from exploring domain knowledge. If the candidate objects are verified, then the PPMs are updated to incorporate the new information. New candidate objects are then generated using the updated domain knowledge, with these steps repeated until no further objects can be detected The inventors have found that the close collaboration between domain knowledge and deep learning reflected in this method allows multiple, close instances of glands and villi to be detected effectively. On one hand, by exploring domain knowledge, the generated candidate objects can form a more complete coverage of the true objects. During training, this enables the classifiers to focus on modeling the target objects rather than being distracted by examples that are mostly background. During testing, this reduces false negatives. Also, since the segmented form of candidate objects helps improve the performance of the classifier by exploring domain knowledge, more accurate segmentation of candidate objects can be obtained in a top-down fashion.

On the other hand, the recognition power of deep learning helps verify candidate objects generated by using domain knowledge. Hence, more reliable information on the detected objects can be propagated to their neighborhoods to reduce ambiguity nearby. Thus, candidate objects can be generated dynamically to take advantage of the continuously reduced ambiguity, as opposed to generating all candidate objects at once.

At 102, a superpixel segmentation of a tissue image, comprising a plurality of superpixels, is generated. At 104, each of the plurality of superpixels is classified as one of epithelium, lumen, and extracellular material. This classification can be performed with any appropriate classifier with classification features drawn from properties of the pixels comprising the superpixel, such as texture, color content, and similar features. In one example, a random forest classifier is used on features including color and texture values derived using Gabor filters.

At 106, a pseudo-probability map is generated from the classified plurality of superpixels. Since each epithelium superpixel suggests that a target object is nearby, the presence of this superpixel would provide evidence, represented as a voting scheme, for the presence of a gland or villus. This evidence is then propagated within a four-dimensional object voting space, where each dimension corresponds to a factor of each single object, including its class (gland or villus), x and y coordinates in the image, and scale. In one example, eight scales, $S_i$, for i=1 to 8, are used, corresponding to roughly 0.011, 0.143, 0.025, 0.05, 0.067, 0.111, 0.167, and 0.25, with the evidence propagated for a distance equal to a product of a selected scale and the length, LS, of a shorter side of the tissue image.

In forming the pseudo-probability map, any superpixels representing lumen and extracellular material near the epithelium superpixel are located. For each class and each scale, the epithelium superpixel is mapped to some locations, based on the following observation for choosing the mapping/voting direction:

1. If the epithelium superpixel is part of a gland, then the gland is likely to lie on the same side as a lumen, but on the opposite side from extracellular material;
2. If the epithelium superpixel is part of a villus, then due to the "duality" of glands and villi, the villus is likely to lie on the same side as extracellular material, but on the opposite side from the lumen.

Accordingly, the epithelium superpixel would vote for the points in a circle of a radius ¼× S(i)× LS centered at the (x, y) coordinates, which are of a distance S(i)×LS away from the center of the epithelium superpixel, towards the chosen direction for its class. The three-dimensional hyper-plane with respect to the class dimension in the four-dimensional object voting space can be utilized as the initial PPMs of each class, containing the location and scale information for the candidate objects.

At 108, a plurality of candidate objects is generated in the tissue image according to the generated initial pseudo-probability map. In one example, a graph search algorithm can be applied to the image, according to the pseudo-probability map, to produce segmentation of candidate objects. The method 100 can utilize various category-specific high-level semantic priors to construct the needed input for graph search. For example, the scale information of each candidate object can be used to set the lengths of the re-sampling rays and the geometric smoothness constraint. A distance transform is applied to the border pixels between epithelium and extracellular material to set up the on-boundary cost of glands. The in-region cost for glands can be set to be low for pixels inside epithelium or lumen, and high for pixels inside extracellular material.

At 110, each candidate object is classified by an associated pattern recognition classifier. This step verifies that detected objects are the selected class to avoid propagating incorrect information in later iterations. In one example, for each candidate object, two small image patches containing the same candidate object, with or without the background masked out, are provided to two convolutional neural networks (CNN) with the same architecture, to verify whether the class of that candidate object is really the one claimed based on the PPMs. The use of domain knowledge to produce the candidate objects prevents excess false negatives in the segmentation and classification process. Essentially, using the knowledge of which PPM the candidate object was determined from, and thus the likely class of the candidate object, reflecting domain knowledge, more accurate segmentation is obtained in a top-down fashion, by utilizing class-specific high-level semantic priors.

In one example, the pattern recognition classifier can be trained dynamically on candidate objects extracted according to the PPMs. To this end, for each class, local maximum points are located in the corresponding initial PPM. Each local maximum point above a certain threshold is treated as one candidate object to perform graph search based segmentation. If a segmented foreground region, $R_{Seg}$, and a manually marked ground truth object region, $R_{GT}$, of that class satisfy $$\frac{R_{Seg} \cap R_{GT}}{R_{Seg}} > 0.6 \text{ and } \frac{R_{Seg} \cap R_{GT}}{R_{GT}} > 0.6,$$

then the candidate object is used as a positive training example of that class. Otherwise, the candidate object is used as a negative training example. Accordingly, the classifier groups the objects into three classes: glands, villi, and non-objects.

In one example, using two CNNs, a small image patch containing the segmented object is cropped, warped to 256×256 pixels, and used in training one CNN. The background region is then masked using the mean values of all training image patches, and the resulting image is used in training the other CNN. The two CNNs have the same architecture and are trained using the same learning algorithm. During operation of the classifier, graph search based segmentation of each candidate object is performed as described above, and the two image patches (with or without background masked out) are provided, respectively, to the two CNNs. The average probabilities output by the two CNNs are used to predict the class.

At 112, it is determined if additional candidate objects remain with a probability above a predetermined threshold. If not (N), the method terminates. If suitable candidate objects remain (Y), using the results of any classification in which a candidate object is verified by the classifier as either glands or villi, the PPMs are updated to propagate this information to the regions around the classified object at 114. In one implementation, for the segmented region of the classified candidate object, $R_{Obj}$, each epithelium superpixel, ES, having a region $R_{ES}$ that satisfies $$\frac{R_{Obj} \cap R_{ES}}{R_{Obj}} > 0.8 \text{ and } \frac{R_{Obj} \cap R_{ES}}{R_{ES}} > 0.8$$

is located. Since these epithelium superpixels are quite unlikely to be part of other target objects, their votes for all points that they have voted for in the 4-D voting space are removed, thus resulting in new PPMs, with the information of the object detection being incorporated and propagated.

The method then returns to 108 to generate and select one or more new candidate objects. Since during the method, the PPMs change dynamically as more and more candidate objects are verified by the classifier and candidate objects are generated based on the new versions of PPMs after update, an appropriate order to generate and process candidate objects must be determined. One possible order is of a greedy and one-by-one fashion. Each time, a point with the largest (pseudo-) probability value is located in the current PPMs, the corresponding candidate object is verified by the classifier, and the PPMs are updated if necessary. This process is repeated until the largest value in current PPMs is below some threshold.

In another implementation, the candidate objects are processed as a batch. Each time, a batch of candidate objects are located, verified by the classifier, and the PPMs are updated if necessary, with this process repeated until no suitable batch of candidate objects can be found. Candidate objects generated within the same batch are selected to avoid candidate objects that are closely related to one another, which could result in conflicting information to propagate subsequently. Finding a suitable batch can be performed by computing a maximal weighted independent set (MWIS) in a vertex weighted graph G. The graph is constructed such that each vertex of G represents a local maximal point above a certain threshold in the PPM of either class, and two vertices are connected by an edge if the (x, y) coordinates of one vertex in the image are within two times the scale of those of the other vertex, with the weight of each vertex being the pseudo-probability value of the corresponding point.

Figure 5:
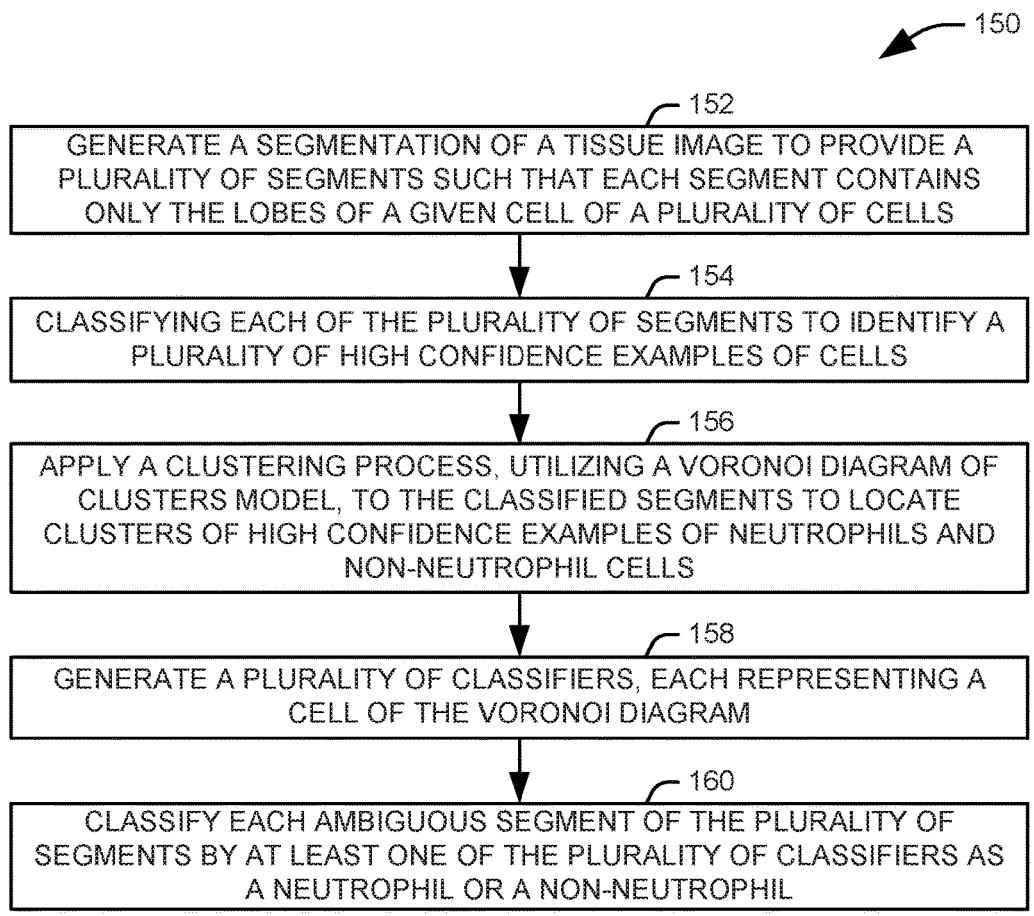
FIG. 5 illustrates a method for identifying neutrophils in tissue images.

FIG. 5 illustrates a method 150 for identifying neutrophils in tissue images. Identifying neutrophils, a major type of immune cell, is critical to the diagnosis of inflammatory diseases, as the locations and number of neutrophils with respect to different tissue layers can be used to determine whether there is clinically significant acute inflammation. In H&E-stained histology tissue images, neutrophils are characterized as having multiple lobes in the nucleus per cell and relatively abundant cytoplasm, but identification of neutrophils in histology tissue images, such as hematoxylin and eosin (H&E) stained images, is a complicated task due to a number of factors. Identifying cells of most types is inherently challenging in this imaging modality, due to non-uniform staining, complex and noisy tissue background, and crowded and distorted cells. Further, identifying neutrophils is more difficult than identification of other major types of immune cells. To begin with, it is necessary to match the lobes of each neutrophil to one another, as otherwise, each lobe might be classified as a single-lobe cell, as the tissue image will likely contain a mixture of various types of cells, with single-lobe cells (e.g., lymphocytes and plasma cells) and multiple-lobe cells (e.g., eosinophils). In addition, the lobes of a neutrophil may not appear clearly as multiple well-separated units but instead, crowded together, which makes grouping these lobes easier but complicates classifying the cell, as the lobes now look like the nuclei of single-lobe cells.

The method 150 combines a segmentation and classification process with a context-based system, implemented as a Voronoi diagram of clusters, using trusted examples of neutrophils from the segmentation and classification. To this end, at 152, a segmentation of the tissue image is generated such that the lobes of each cell, particularly the neutrophil, are grouped into one segment, which contains no lobes from other cells. In one example, the segmentation is performed via an iterative edge labeling process, which is essentially based on merging pairs of segments at different scales. At each iteration, representing a specific scale, instead of hypothetically designing some criteria for segment merging, the criteria are derived from knowledge from training examples of edges in a segment adjacency graph and optimally refined globally by applying a Markov random field to the edge dual graph of the segment adjacency graph. By combining learning and refining characteristics exhibited by pairs of segments at different scales, difficulties caused by the highly complex nature of objects and background tissues in H&E-stained tissue images can be mitigated. It is also more natural to obtain segmentation of multiple objects by binary classification based on the edge view, rather than the vertex view, of the segment adjacency graph, since if two adjacent vertices of the segment adjacency graph are both labeled as foreground, it is not possible to tell if the corresponding two segments, sharing some common border pixels, are one or two objects.

In one implementation, the segmentation is initiated by applying a superpixel segmentation, with the parameters of the method tuned so that the cells are broken into pieces to obtain an over-segmentation. For each cell considered as training data, a group of points is selected in that cell such that the union of the segments in the initial segmentation, each containing at least one such point, can roughly represent the region of that cell. This region of the cell is referred to herein as the training region, TR, of that cell. Training regions are used to construct training examples of edges of the segment adjacency graph without forcing the user to provide additional training data at each iteration. Once constructed, these training regions will not change during the segmentation.

The segment adjacency graph, SAdjG, is formed from a set, S, of all segmentations in the image as a set of vertices, $V_{SAdjG}$, comprising each segment, s, in S, and a set of edges, $E_{SAdjG}$, providing edges between segments sharing border pixels. Weighted training examples are then constructed for the edges of the graph SAdjG. In iterations other than the initial one, segments obtained may cross the boundaries of the training regions, and the weights are used to compensate for the potentially noisy knowledge learned in such situations. The set of positive training samples for each cell includes all pairs of segments $(s_1, s_2)$ representing edges in the set of edges for which each of the two segments overlap, at least in part, with the training region, TR. The weight, $W(s_1, s_2)$, for each positive training sample can be determined as an average of the proportion of the union of the two segments that overlaps with the training region and the proportion of the training region that overlaps with the union of the two segments, such that:

$$W(s_1, s_2) = 0.5\left[\frac{(s_1 \cup s_2) \cap TR}{(s_1 \cup s_2)} + \frac{(s_1 \cup s_2) \cap TR}{TR}\right] \quad \text{Eq. 4}$$

The set of negative training samples for each cell includes all pairs of segments (s, n) representing edges in the set of edges for which one of the two segments, s, overlaps, at least in part, with the training region, while the other segment, n, does not. The weight, $W(s, n)$, for each negative training sample can be determined as an average of the proportion of the segment, s, that overlaps with the training region and the proportion of the training region that overlaps with the segment, such that:

$$W(s, n) = 0.5\left[\frac{s \cap TR}{s} + \frac{s \cap TR}{TR}\right] \quad \text{Eq. 5}$$

A binary classifier is then built for the edges of SAdjG, representing domain knowledge of what pairs of segments within or not within the same cell usually look like in the current iteration, that is, at the current scale. In one implementation, a random forest classifier is used, although any appropriate classification model can be used. Features for the classification can include either features associated with each individual of the two corresponding segments (e.g., color, texture, compactness, etc), or pairwise features exhibited between the two segments (e.g., color difference, texture difference, the number of common border pixels, etc). An edge duel graph is then generated in which each vertex of the edge duel graph is an edge of the SAdjG, and each edge of the edge duel graph connects vertices sharing a first segment of the pair of SAdjG segments connected by the SAdjG edge represented by each edge dual graph vertex.

A binary Markov random field (MRF) model is then applied to the edge dual graph, with each vertex of the edge dual graph, and correspondingly, each edge of SAdjG, being assigned a value of '1' or '0', representing whether the corresponding pair of segments is within the same cell. By merging the corresponding pair of segments for each edge of SAdjG labeled as '1' into one segment, a new segmentation can be generated. The unary cost of MRF comes directly from the probability output of the classifier, with a pairwise cost between two labels equal to zero, if both labels are zero, 0.5 if one label in the pair is a one, and one if both labels are ones. In contrast to the typical usage of pairwise cost as smoothness constraint on labeling, it is used here to penalize aggressive merging behavior of the segments, which may result in undesired under-segmentation. A new segment adjacency graph is then generated from the new segmentation, and the process is repeated until the resulting segmentation is relatively stable, that is, the change in segmentations between iterations is below a threshold level. In an example implementation, this generally occurs after four or five iterations.

At 154, the resulting segments are classified to identify a plurality of high confidence examples of neutrophils and non-neutrophil cells. In one implementation, a random forest classifier is used, although any appropriate classification model can be used. Features for the classification can include, for example, the color, texture, and compactness, of each segment. In practice, samples classified with a probability greater than 0.9 are retained as high confidence examples.

In another implementation, deep convolutional neural networks (CNNs) are applied to learn a hierarchical representation of the low, mid, and high level features of the cells. Such a network maps each segment, via a series of parameterized layers, into probabilities of the target classes, specifically neutrophils and non-neutrophils. The parameters of the layers are learned during training, and some of them can be viewed as filters. Responses to the filters in lower layers (i.e., closer to the input image) usually contain low (e.g., edges, corners) or mid (e.g., correlations between edges) level features, and responses in higher layers contain high level semantic features related to the target classes. In one example, the CNN has eight layers, of which the first 5 layers are convolutional. The input to each convolutional layer is first convolved by a set of learned filters, and then passes through a rectified linear function to accelerate the training. The learned filters can be relatively small, to allow for low level features, such as edges and corners, to be captured. A stride of the filters can be set to one to avoid aliasing artifacts. In some implementations, the input then goes through max pooling to make sure the learned model is robust to small translations in the images, and local normalization before is output to the next layer. The remaining three layers are fully connected, with a softmax cost function minimized at the last layer.

To train the CNN, a stochastic gradient descent is utilized with a batch size of 512. The learning rate is initialized as 0.01, the momentum is initialized as 0.9, and the weight decay is initialized as 0.0005. The learning rate is decreased three times before termination, with 30,000 iterations over the batches. To combat overfitting, data augmentation and drop out are applied. For data augmentation, ten images are sub-cropped (corners and centers with or without horizontal flips) of size 57×57 from the original image patch of size 64×64. Drop out is applied at the first two fully connected layers with a drop out rate of 0.5.

In the clinical setting of studying inflammatory bowel disease, neutrophils indicate the presence of acute inflammation. Neutrophil cell numbers and density can be low, but still are important in comparison to other types of immune cells, such as leukocytes and plasma cells. The noisy and complex environment of histology tissue images may cause many artifacts that look similar to neutrophils. Hence, a conservative strategy is used to identify neutrophils, by penalizing more when a non-neutrophil is misclassified as a neutrophil than when a neutrophil is misclassified as a non-neutrophil, during the training of CNN. This is done via multiplying by two the computed softmax loss when a non-neutrophil is misclassified as a neutrophil.

At 156, a clustering process, utilizing a Voronoi diagram of clusters model, is applied to locate clusters of high confidence examples of neutrophils and non-neutrophil cells. In one example, density-based clustering is applied to the trustable examples of neutrophils, to capture the potential clustering behavior of neutrophils. A Voronoi diagram of the clusters is then calculated, with each site being either a single, high confidence neutrophil or a cluster of such neutrophils. The distance between a point, p, and a cluster of points, $C=\{p_1, p_2, \ldots p_m\}$ is defined as:

$$D(p, C) = \sum_{i=1}^{m} F(p, p_i); \quad \text{Eq. 6}$$

$$F(p, p_i) = \begin{cases} \dfrac{w(p_i)}{d(p, p_i)^2}, & \text{if } d(p, p_i) \leq dist_T \\ 0, & \text{otherwise} \end{cases}$$

where $F(p, p_i)$ is a function measuring the influence of a point $p_i \in C$ on p, which depends on both the weight $w(p_i)$, measuring the importance of $p_i$, and set as the confidence with which the segment represented by the point was classified, and the Euclidean distance $d(p, p_i)$, and $dist_T$ is a threshold beyond which the influence of a point is ignored, set as 160 pixels in one example.

Essentially, D(p, C) measures the amount of collective influence of a cluster C on any point p. Thus, a point p belongs to a geometric Voronoi diagram cell $C_{VD}$ if the distance between p and the corresponding site of $C_{VD}$ is the largest among all clusters. Note that since $F(p,p_i)$ is truncated by a Euclidean distance threshold $dist_T$, there may exist points far away from all clusters that do not lie in any Voronoi diagram cell.

At 158, a plurality of classifiers, each representing a Voronoi diagram cell, is generated. Specifically, each classifier is trained such that its positive and negative training examples are high confidence examples of neutrophils and non-neutrophils whose center locations lie in its associated Voronoi diagram cell. Each classifier represents a local expert for its associated cell, to classify based on what neutrophils and non-neutrophils look like in the neighborhood of an ambiguous segment. In one implementation, each classifier is a random forest classifier, although any appropriate classification model can be used.

At 160, each ambiguous segment is classified by one or more of the plurality of classifiers as a neutrophil or a non-neutrophil. For each segment, a context is defined as the set of all Voronoi diagram cells overlapped with the circle with a radius R, set as sixty pixels in one example, centered at the center of the segment. It is possible for an ambiguous segment to have an empty context, and such segments are classified as non-neutrophil in such cases. The probability output of the segment, s, is the average of the probability outputs by the classifier of each Voronoi diagram cell in its context, weighted by normalized distance D(p, C) between the center point p of the segment s and the corresponding cluster C of each such Voronoi diagram cell. We take s as a neutrophil if the probability output for the neutrophil class is above a threshold value. In one example, the threshold value is 0.5.

Figure 6:
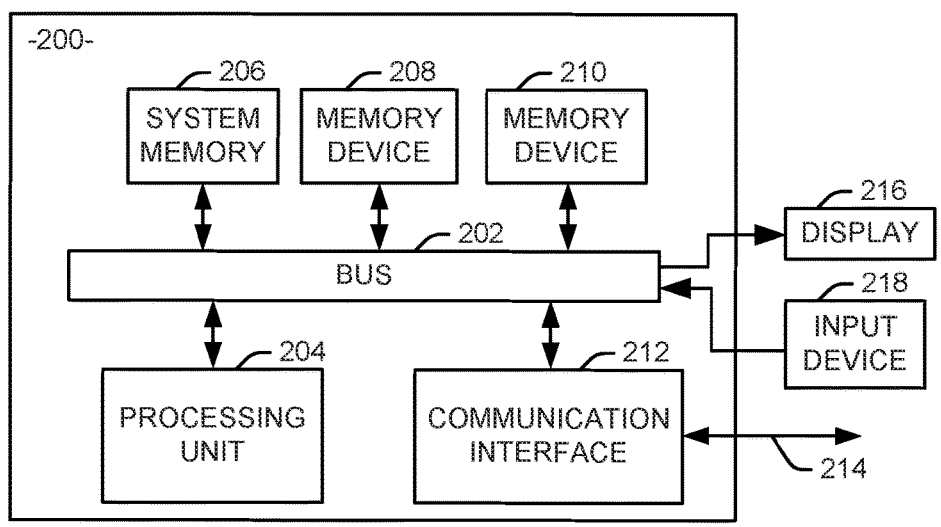
FIG. 6 is a schematic block diagram illustrating an exemplary system of hardware components capable of implementing examples of the systems and methods

FIG. 6 is a schematic block diagram illustrating an exemplary system 200 of hardware components capable of implementing examples of the systems and methods disclosed in FIGS. 1-5. The system 200 can include various systems and subsystems. The system 200 can be a personal computer, a laptop computer, a workstation, a computer system, an appliance, an application-specific integrated circuit (ASIC), a server, a server blade center, a server farm, etc.

The system 200 can include a system bus 202, a processing unit 204, a system memory 206, memory devices 208 and 210, a communication interface 212 (e.g., a network interface), a communication link 214, a display 216 (e.g., a video screen), and an input device 218 (e.g., a keyboard and/or a mouse). The system bus 202 can be in communication with the processing unit 204 and the system memory 206. The additional memory devices 208 and 210, such as a hard disk drive, server, stand alone database, or other non-volatile memory, can also be in communication with the system bus 202. The system bus 202 interconnects the processing unit 204, the memory devices 206-210, the communication interface 212, the display 216, and the input device 218. In some examples, the system bus 202 also interconnects an additional port (not shown), such as a universal serial bus (USB) port.

The processing unit 204 can be a computing device and can include an application-specific integrated circuit (ASIC). The processing unit 204 executes a set of instructions to implement the operations of examples disclosed herein. The processing unit can include a processing core.

The additional memory devices 206, 208 and 210 can store data, programs, instructions, database queries in text or compiled form, and any other information that can be needed to operate a computer. The memories 206, 208 and 210 can be implemented as computer-readable media (integrated or removable) such as a memory card, disk drive, compact disk (CD), or server accessible over a network. In certain examples, the memories 206, 208 and 210 can comprise text, images, video, and/or audio, portions of which can be available in formats comprehensible to human beings.

Additionally or alternatively, the system 200 can access an external data source or query source through the communication interface 212, which can communicate with the system bus 202 and the communication link 214.

In operation, the system 200 can be used to implement one or more parts of a medical imaging system in accordance with the present invention. Computer executable logic for implementing the imaging system resides on one or more of the system memory 206, and the memory devices 208, 210 in accordance with certain examples. The processing unit 204 executes one or more computer executable instructions originating from the system memory 206 and the memory devices 208 and 210. The term "computer readable medium" as used herein refers to a medium that participates in providing instructions to the processing unit 204 for execution, and can, in practice, refer to multiple, operatively connected apparatuses for storing machine executable instructions.

What have been described above are examples of the present invention. It is, of course, not possible to describe every conceivable combination of components or methodologies for purposes of describing the present invention, but one of ordinary skills in the art will recognize that many further combinations and permutations of the present invention are possible. Accordingly, the present invention is intended to embrace all such alterations, modifications, and variations that fall within the scope of the appended claims.

What is claimed is:

1. A method of identifying markers for inflammation in a tissue image comprising:
   capturing the tissue image as an image of a histology slide;
   segmenting subcellular structures in the tissue image, via a first automated process, to identify at least one variety of immune cells within the tissue image;
   identifying glands and villi within the tissue image via a second automated process;
   identifying neutrophils within the tissue image via a third automated process; and providing an output representing the identified at least one variety of immune cells, the identified glands, the identified villi, and the identified neutrophils to a human operator.

2. The method of claim 1, wherein segmenting subcellular structures in the tissue image via the first automated process comprises:
constructing a layered graph model, comprising a plurality of vertices and a plurality of edges according to at least one constraint;
determining respective weights for each of the plurality of vertices and the plurality of edges according to at least one photometric prior; and
determining a set of boundaries, represented by a path having a lowest total energy in the layered graph model, for a nucleus and a cytoplasm of a cell represented by the layered graph model.

3. The method of claim 2, further comprising identifying the cell as one of a plasma cell, a lymphocyte, and an eosinophil from the determined set of boundaries.

4. The method of claim 1, wherein identifying glands and villi within the tissue image via the second automated process comprises:
generating a superpixel segmentation of the image comprising a plurality of superpixels;
classifying each of the plurality of superpixels as one of epithelium, lumen, and extracellular material;
generating an initial pseudo-probability map from the classified plurality of superpixels;
generating a plurality of candidate objects in the tissue image according to the generated initial pseudo-probability map; and
classifying each candidate object by an associated pattern recognition classifier.

5. The method of claim 1, wherein identifying neutrophils within the tissue image via the third automated process comprises:
generating a segmentation of the tissue image such that the lobes of each cell of a plurality of cells are grouped into one segment, which contains no lobes from other cells, to provide a plurality of segments;
classifying each of the plurality of segments to identify a plurality of high confidence examples of neutrophils and non-neutrophil cells;
applying a clustering process, utilizing a Voronoi diagram of clusters model, to the classified segments to locate high-confidence and low-confidence examples of neutrophils and non-neutrophil cells;
generating a plurality of classifiers, each representing a Voronoi diagram cell; and
classifying each ambiguous segment of the plurality of segments by at least one of the plurality of classifiers as a neutrophil or a non-neutrophil.

* * * * *